Figure 3:
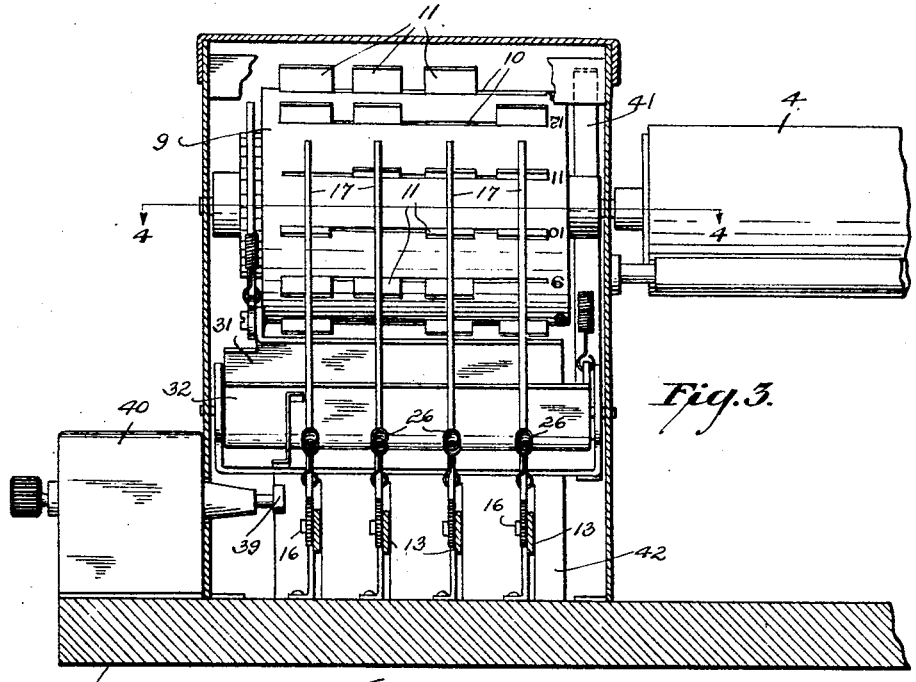

May 22, 1928.
S. L. PRESSEY
1,670,480
MACHINE FOR INTELLIGENCE TESTS
Filed Jan. 30, 1926
3 Sheets-Sheet 1
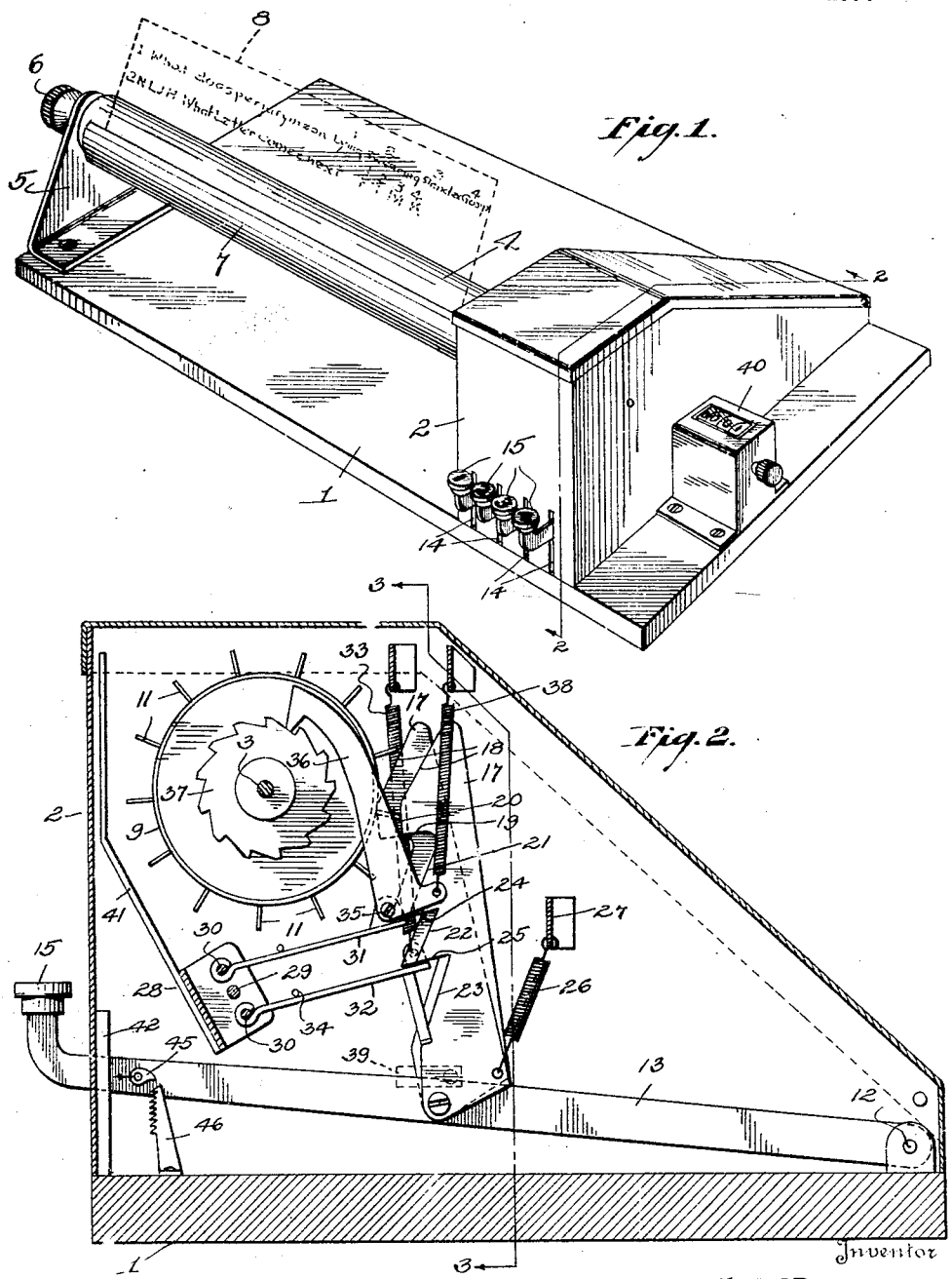

May 22, 1928.

S. L. PRESSEY 1,670,480

MACHINE FOR INTELLIGENCE TESTS

Filed Jan. 30, 1926

3 Sheets-Sheet 2

Inventor
S. L. Pressey
By W. D. McDowell.
Attorney

May 22, 1928.
S. L. PRESSEY
1,670,480
MACHINE FOR INTELLIGENCE TESTS
Filed Jan. 30, 1926    3 Sheets-Sheet 3
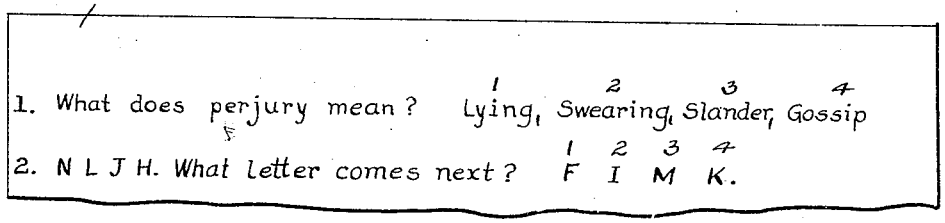
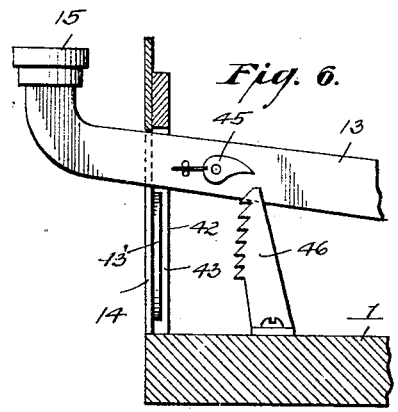
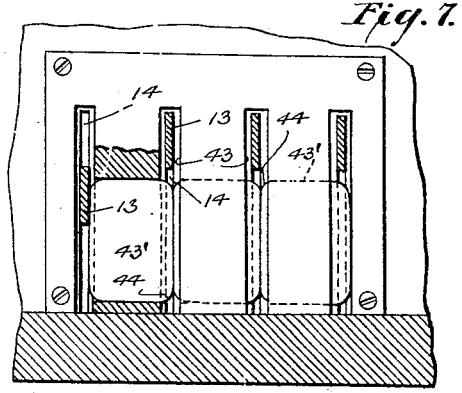
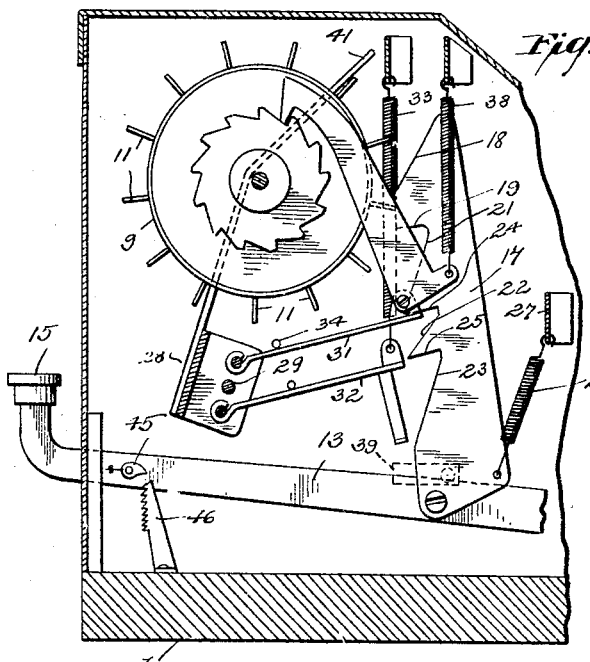
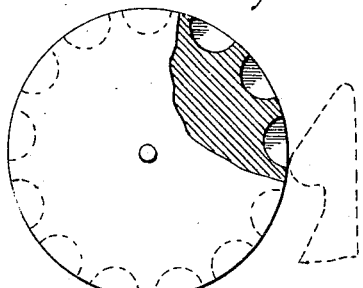
Inventor
S. L. Pressey
W. D. McDowell.
Attorney Patented May 22, 1928.

1,670,480

UNITED STATES PATENT OFFICE.

SIDNEY L. PRESSEY, OF COLUMBUS, OHIO.

MACHINE FOR INTELLIGENCE TESTS.

Application filed January 30, 1926. Serial No. 85,002.

This invention relates to a machine or apparatus especially designed for psychological or intelligence tests embodying means by which the student under course of examination, operates the machine so as to actuate a registering or recording means by which the accuracy of the student's responses to given questions and stimuli may be noted.

In accordance with the invention the apparatus presents the stimuli, which may be of almost any nature, including questions of the selective answer type as frequently uesd in intelligence tests, successively to the view of the subject. The student or subject reacts by actuating one of a plurality of selectors. In accordance with one system of operating the apparatus, the movement of a selector presents a new question, and at the same time operates the counter or registering mechanism if the reaction is correct. By the simple operation of a shift means the apparatus may be so readjusted that a new question or stimulus is presented only when the correct reaction or answer to the first question is given, the counter or registering mechanism being operated to count all tries.

Another object of the invention resides in an apparatus of this character which is preferably mechanical in operation so as to be positive and reliable, and to avoid the presence of cumbersome batteries or contacts. The apparatus, as will be apparent hereinafter, is believed to have distinct possibilities in facilitating laboratory experimentation and to be capable of functioning as an intelligence testing machine for either psychological or other tests.

In the preferred form of the invention, a sheet of typewriter paper containing a series of questions, each followed by a plurality of possible answers (or any other series of stimuli permitting of choice) is carried by the platen of the machine in the manner of an ordinary typewriting machine. The student or subject presses one of a plurality of selectors according as he thinks that the stimulus or answer is correct, there being a corresponding number of selectors to the number of stimuli presented and following each question. The apparatus as to its principal features; first, with one adjustment or condition of operation, the apparatus operates the platen so as to turn up a new question or series of stimuli each time any selector is operated, but counts only the correct responses. In its second position of adjustment this operation is substantially reversed. That is, the platen is operated to turn up a new question only when the correct selector is pressed; but every reaction is counted.

The test apparatus and the test sheet or platen are coordinated by the provision of staggered fins provided on an actuating drum, the arrangement being such that for each row of radially disposed fins on the drum there is a space provided between the fins regulated to accord with the correct response. By the provision and spacing of these fins, whenever the correct selector is operated in accordance with a given set of stimuli, one of the above systems is put into operation to provide for the actuation of the registering means.

Figure 4:
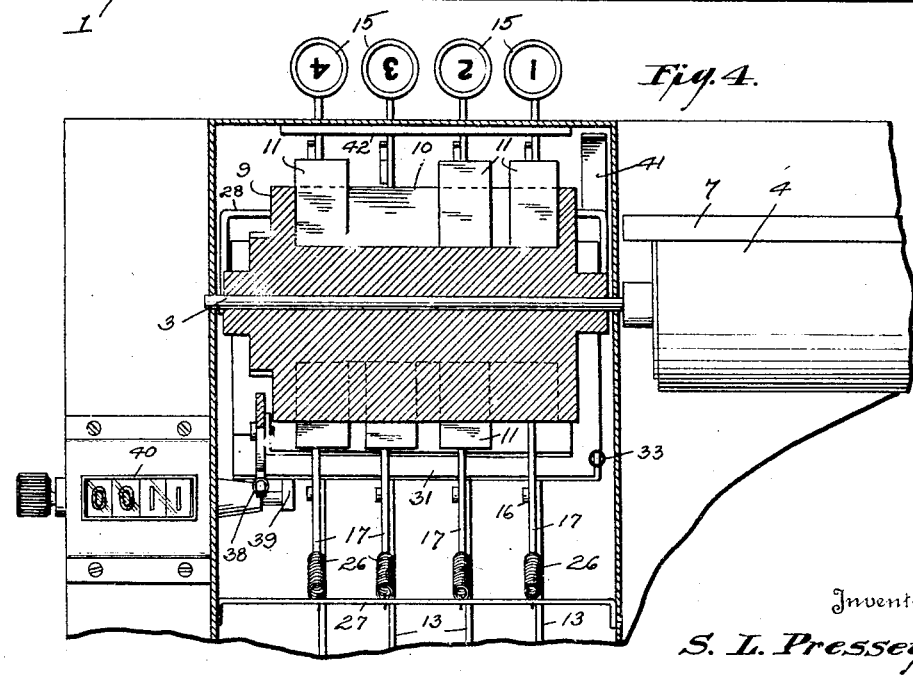

For a further understanding of the invention reference is to be had to the following description and the accompanying drawings, wherein:

Figure 1 is a perspective view of the testing apparatus comprising the present invention, Figure 2 is a vertical sectional view taken on the plane indicated by the line 2—2 of Figure 1, Figure 3 is a vertical sectional view on the line 3—3 of Figure 2, Figure 4 is a horizontal sectional view on the line 4—4 of Figure 3, Figure 5 is a fragmentary view of one of the test sheets which may be used in connection with the apparatus, Figure 6 is an enlarged vertical sectional view disclosing the lock means for preventing undue return of the selectors to a normal position following initial actuation, Figure 7 is an enlarged vertical sectional view disclosing the means for perventing the actuation of but more than one selector for any given operation, Figure 8 is a vertical sectional view, similar to Figure 2, and illustrating the position of the operating parts of the apparatus when the latter is set to register each operation of the selectors.

Fig. 9 is an end elevation of a slightly modified form of the drum used in connection with the apparatus.

In the form of the invention disclosed specifically in the accompanying drawings which, however, must be taken as merely illustrative of but a single form of the invention, the numeral 1 designates the base plate of the machine upon which is mounted, adjacent to one end of the plate, a casing 2 in the vertical side walls of which is mounted for rotation a horizontally disposed shaft 3, upon which is carried a platen 4. This platen may be of the ordinary roll type, commonly used in typewriter construction, and receives axially the shaft 3, which is journaled in a bearing bracket 5 mounted upon the base plate 1. A knurled knob 6 may be provided upon the outer end of the shaft 3 to rotate the platen. Surrounding the platen is a fixed guard plate 7, extending between the bracket 5 and the casing 2, the guard plate being spaced from the platen a sufficient distance to permit of the passage of a test sheet 8 therebetween and yet to permit sufficient pressure to be exercised on said sheet so as to retain the same in its adjusted positions substantially after the manner of a typewriter.

Arranged within the casing 2 and fixed upon the platen shaft 3 is a drum 9, provided with a plurality of radiating slots 10, and arranged to be positioned within these slots and adjustable longitudinally thereof is a plurality of frictionally held selector fins 11. By reference to Figures 2 to 4 it will be observed that these fins are mounted in the slots 10 so as to be disposed radially with respect to the axis 3 and that the fins are extended to project beyond the outer circumstance of the drum 9. In this form of the invention there are but three of the fins for each of the slots 10, leaving an unoccupied space in each row of fins, and this unoccupied space and the relative positioning of the fins in relation to the drum forms an important factor in the operation and use of the apparatus.

Pivotally mounted as at 12 upon the base plate 1, and arranged within the casing 2, is a plurality of levers or selectors 13, the latter having their free ends extended through vertical slots 14 provided in the front wall of the casing 2 and in this instance formed, beyond the front of the casing, with upturned key shaped extremities 15, which bear suitable indicia in this instance in the form of numerals.

Pivotally connected as at 16 with each of the levers or selectors 13, at a point intermediate of the length of the latter is a pivoted keeper 17. Each keeper is formed to include angularly disposed upper edge 18 beneath which is arranged a shoulder 19, and between the edge 18 and the shoulder 19 there is formed a substantially vertical edge 20. Below the shoulder 19 each keeper is formed to include inclined edges 21, 22 and 23 and with cooperating substantially horizontal shoulders 24 and 25. To the lower portion of each keeper there is connected a spring 26, carried by a fixed bracket 27, and the tendency of the springs 26 is to force the keeper 17 toward the drum 9, rotating said keepers about their pivots 16 on the selectors 13.

Arranged beneath the drum 9 is a frame 28 which is pivotally carried by a stationary rod 29 disposed in the casing 2. Also pivotally connected with the frame 28 about fixed parallel rods 30, carried by said frame and arranged on opposite sides of the center rod 29, is a pair of plates 31 and 32, which extend forwardly and are designed for cooperation with the shoulders 24 and 25 of the keepers. The plates 32 are connected with coil springs 33, which normally serve to elevate said plates and maintain the same in engagement with fixed pins or other stops 34 carried by the walls of the casing 2. Normally, the positions of the pins 34 are such as to maintain the outer edges of the plates 31 and 32 in registration with the shoulders 24 and 25. This arrangement of the parts is clearly disclosed in Figures 2 and 8. Pivotally carried by the upper plate 31, as indicated at 35, is a detent 36, having its upper end formed for engagement with a ratchet wheel 37 mounted upon the drum 9, a coil spring 38 being associated with said detent so as to maintain engagement of the detent with said ratchet wheel. Also, disposed beneath the lower plate 32 is an actuating arm 39 of a counter or registering mechanism 40 and the arrangement of the arm 39 is such that whenever the plate 32 is rocked from a position away from engagement with its stop 34, the arm 39 will be engaged so as to actuate the registering mechanism.

In the use of the apparatus the test sheet 8 is placed around the platen 4 so that when the device is used in conducting intelligence tests the first question will be presented, such as is disclosed in Figure 5, followed by a series of answers or stimuli. When the apparatus is set, as shown in Figure 2, an adjustment which is effected by rocking the frame 28 through the medium of the arm 41, the apparatus is in a condition to register each actuation of a selector but will rotate the platen only when a correct answer has been given. After reading the question the subject presses one of the selectors 13 bearing a numeral corresponding to the numeral of the stimulus which the subject believes to be the correct answer to the interrogatory. In the adjustment of the apparatus as disclosed in Figure 2, if the correct selector has been pressed, the keeper plate 17 is permitted to move inwardly, as shown by dotted lines in Figure 2, until the edge 20 contacts with the outer circumferential surface of the drum 9, since by predetermined arrangement the drum at this point does not possess a fin 11 which would interfere with the forward movement of the keeper, the latter responding to the influence of its spring 26 to engage the drum. When thus positioned it will be observed that the shoulders 24 and 25 will be disposed over the outer edges of the plates 31 and 32, so that upon the pressing of the proper selector or key in a downward direction, the keeper plate will move in unison therewith. This causes the plate 31 to rock about its pivot on the frame 28 so as to actuate the detent 36 and revolve the platen to present a new question and, simultaneously, the shoulder 25 operates on the plate 32 so as to swing the latter about its pivot and operate the arm 39 of the counter 40.

Assuming, however, the subject presses a key other than the correct key. In this instance it will be observed that the keeper plate 17 of the improperly pressed key can not swing over to engage the drum since the fin 11 physically engages said keeper and causes the same to maintain the full line position disclosed in Figure 2 or a position out of contact with the drum. Now, upon the further depression of the rocking selected key, it will be noted that the shoulder 24 of the detent will not engage the edge of the plate 31 so as to actuate the detent 36 and the platen 4. However, the shoulder 25 does engage the lower plate 32 so that the latter will be moved to actuate the counter. By this method it will be observed that the counter will register each operation of the selectors, whether right or wrong, but the platen is operated only when the proper key has been worked.

Another system of operation has been disclosed in Figure 8. In this arrangement of the parts the frame 28 has been moved to assume a second position by the adjustment of the arm 41. The operation here is virtually the reverse of the system of operation set forth and described concerning the position of the parts as in Figure 2. It will be observed that, in Figure 8, when the proper key or selector has been pressed, the keeper plate 17, being in engagement with the circumference of the drum 9, because of the absence of a fin 11 from this particular portion of the drum, has its shoulders 24 and 25 disposed over the plates 31 and 32, so that both plates will be rocked upon downward movement of the lever, thereby actuating the platen and also the counter mechanism. If the wrong key has been selected, the keeper plate being held away from engagement with the drum by the position of a fin 11 moves downwardly with the selected key but operates only the upper plate 31, since the shoulder 25 does not engage with the lower plate, and therefore the counter mechanism is not operated. In this system of operation the platen rotates every time a key is pressed but the counter mechanism only registers correct responses or reactions, whereas in Figure 2 the position of the parts is such that the counter mechanism registers every key operation but rotates the platen only upon the selection of a correct response and the consequent actuation of a proper key.

In the modified form disclosed in Figure 9 the outer periphery of the drum 9 is formed with indentations instead of outstanding fins as disclosed in the preferred form.

To prevent movement of more than one key at a time the casing has its front wall provided with an interiorly disposed housing 42 having slots 43 registering with the slots 14 for the reception of the selectors 13. Within the housing there is disposed a plurality of spacers 43', having rounded edges 44. It will be seen, as shown in Figure 7, that when a key is moved downwardly, the spacers 43 are crowded together in the housing so that it will be impossible to move any other of the selectors, the rounded edges 44 of the spacers permitting the latter to move in response to engagement with a depressed key. Also, in addition to this mechanism it is necessary following initial actuation of a selector to carry on through with its actuation. This result is effectively attained by mounting upon each of the selectors a spring pressed pawl 45 arranged for engagement with fixed ratchet bars 46 mounted on the base 1 within the casing 2. It will be seen that after movement of a selector has been initiated, the pawl 45 will engage with the ratchet bar 46 to prevent return or upward movement of the selector, and in order to return such selector to its normal position, it is necessary to force the same downwardly to the complete lower end of its slot 14 so that the pawl 45 will be positioned below the teeth of the ratchet bar 46. When this relation occurs the selector may move upwardly with freedom since the pawl will then be revolved to avoid obstructive engagement with the teeth of the ratchet bar.

In view of the foregoing description, taken in connection with the accompanying drawings it will be seen that the present invention provides a machine or apparatus capable of functioning as an intelligence testing device by means of which examinations or study of any nature, may be carried on quickly and accurately with but a minimum of wasted time. The device is especially useful in conducting intelligence tests for determining the accuracy of the subject's selection, in that by the use of the device the speed with which a test of this kind can be conducted is greatly accelerated over prior methods involving the making of marks or the writing of answers to the questions presented. In other words the mental quickness and alertness as well as the subject's general knowledge can be more readily demonstrated with the use of the apparatus herein described than by the employment of previous methods of which I now have knowledge.

It will be understood that the cover of the casing may be readily removed to control the positioning of the shift lever 41 so that an instructor may set the apparatus so that it will operate with one or the other of the above described systems. It will be understood that the apparatus and the test sheet are coordinated by sliding the fins on the drum so that for each roadway of fins there will be a space, corresponding to the width of a fin, and this space is disposed in accordance with the correct stimulus following each given question. It will be appreciated that this spacing may be changed at will in accordance with the questions and stimuli presented, thereby adapting the machine to varying tests.

While the apparatus has been described as adapted for use in conducting intelligence tests, it will be understood that this term is not employed in a narow or limiting sense and is to be construed as covering tests of general or special ability and attainment, as in school subjects as well as the ordinary psychological examinations.

What is claimed is:

1. In apparatus of the character set forth, a rotatable test sheet holder, a plurality of individually movable selectors, individual keepers carried by said selectors, a pair of pivoted plates, a pawl and ratchet mechanism operated by the movement of one of said plates for rotating said holder, a counter mechanism operated by the movement of the other of said plates, and means provided in connection with said holder and operating upon said keepers to cause the latter to operate said plates upon the movement of a given keeper.

2. In apparatus of the character set forth, a test sheet holder, a radially slotted drum rotatable with said holder, a plurality of fins positioned within the slots of said drum and extending radially therefrom, a plurality of individually operable selectors, a keeper pivotally mounted on each of said selectors, means acting on said keepers to move the latter towards said drum, said keepers being normally spaced from said drum by said fins, a pair of pivoted plates, a counter mechanism, and means operable upon the actuation of a selector having a keeper in engagement with said drum to operate said plates so as to rotate said holder and operate said counter mechanism.

3. In apparatus of the character set forth, a test sheet holder, a shaft upon which said holder is supported for rotation, a drum carried by said shaft and provided with a plurality of longitudinally adjustable radially disposed projections, a plurality of pivoted selector keys, pivoted keepers carried by said keys, spring means acting on said keepers to force the latter toward said projections, said projections being spaced to permit one of the keepers carried by one of said keys to engage directly with said drum, a counter mechanism, a holder rotating mechanism, and means operated by the keeper in engagement with said drum to operate said counter and holder mechanisms.

4. In apparatus of the character set forth, a test sheet holder, a drum revoluble with said holder and provided with a plurality of longitudinally adjustable radially extending projections, a plurality of pivoted keys, spring pressed keepers carried by said keys and arranged for engagement with said projections, said projections being spaced as to permit at least one of said keepers to engage directly with said drum, a pair of pivoted plates arranged in registration with shoulders provided on said keepers, a pawl and ratchet operating mechanism connected with one of said plates for rotating said drum and holder, and a counter mechanism arranged for cooperation with the other of said plates, whereby upon the operation of a key carrying the keeper in engagement with the drum, said plates will be rocked to rotate said drum and holder and to operate said counter mechanism.

5. In apparatus of the character set forth, a test sheet holder mounted for rotation about a horizontal axis, a drum revoluble with said holder and provided with a plurality of longitudinally adjustable radially disposed projections, a plurality of pivoted selector keys, a keeper pivotally mounted on each of said keys, spring means engaging with said keepers and operating to maintain the same in engagement with said projections and in direct engagement with said drum when not restrained by said projections, each of said keepers being provided with a plurality of shoulders, a trip mechanism arranged in the path of movement of a keeper engaged directly with said drum to effect the rotation of said test sheet holder.

6. In apparatus of the character set forth, a base, upstanding bearings carried by said base and test sheet holder rotatably mounted in said bearings for rotation about a horizontal axis, a drum rotatable with said holder, longitudinally adjustable rotating projection mounted upon said drum, a plurality of pivoted selector keys mounted on said base, a pivoted keeper carried by each of said keys and formed to include a plurality of offset shoulders, means operating on said keepers to maintain the latter in engagement with said projections and in engagement with said drum when not restrained by said projections, a pivoted frame, a pair of plates carried by said frame and arranged to engage simultaneously with said shoulders when a keeper occupies a position in engagement with the said drum and to engage singly with said shoulders when said keepers are in engagement with said projections, a pawl and ratchet mechanism for rotating said holder actuated by one of said plates, and a counter mechanism for registering the movement of said keys actuated by the other of said plates.

7. In apparatus of the character set forth, a rotatable unit having a plurality of peripherally shouldered members, a plurality of individually movable selectors, individual keepers carried by said selectors, means acting on said keepers to move the latter toward said shouldered members, a counter mechanism, the shoulders being so spaced on the members so as to permit at least one of said keepers to move said unit and counter mechanism upon the actuation of a given keeper.

8. In apparatus of the character set forth, a rotatable unit provided with a plurality of longitudinally spaced circularly disposed sets of shoulders, a plurality of selector keys, keepers carried by said keys, spring means acting on said keepers to force the latter toward said shoulders, said shoulders being spaced so as to permit at least one of said keepers to engage directly with one set of shoulders to effect the rotation of said unit.

9. In apparatus of the character set forth, a drum, a plurality of individually movable selectors, individual keepers carried by said selectors, means acting on said keepers to move the latter toward said drum, a counter mechanism, and means provided in connection with said drum and operating upon said keepers to cause the latter to rotate said drum and counter mechanism upon the movement of a given keeper.

10. In apparatus of the character set forth, a rotatable shouldered member, a plurality of individually movable selectors, individual keepers carried by said selectors, means acting on said keepers to move the latter in cooperative engagement with certain shoulders of said member, the shoulders being so spaced as to permit at least one of said keepers to move said member, a counter mechanism arranged for co-operation with said keepers whereby upon the operation of certain selectors the said member and counter mechanism will be operated.

11. In apparatus of the character set forth, a rotatable unit having a plurality of peripherally shouldered members, a plurality of individually movable selectors, individual keepers carried by said selectors, means acting on said keepers to move the latter toward said shouldered members, a counter mechanism, the shoulders being so spaced on the members as to permit at least one of said keepers to move said unit and counter mechanism upon the actuation of a given keeper, the other keepers operating to move only said unit or only the counter mechanism.

12. In apparatus of the character set forth, a drum, a plurality of individually movable selectors, individual keepers carried by said selectors, means acting on said keepers to move the latter toward said drum, a counter mechanism, and means provided in connection with said drum and operating upon said keepers to cause the latter to rotate said drum and counter mechanism upon the movement of a given keeper, the movement of the remaining selectors serving to move only the drum or counter mechanism.

13. In apparatus of the character set forth, a drum, a plurality of individually movable selectors, individual keepers carried by said selectors, means acting on said keepers to move the latter toward said drum, a counter mechanism, a drum rotating mechanism, and means provided in connection with said drum and operating upon said keepers so that movement of a given keeper will cause operation of both mechanisms while movement of any other keeper will cause operation of only one of said mechanisms.

14. In apparatus of the character set forth, a drum, a plurality of individually movable selectors, individual keepers operatively associated with said selectors, a counter mechanism, a drum rotating mechanism, and means provided in connection with said drum and operating upon said keepers whereby, for a given position of the drum, operation of a given keeper will cause operation of both of said mechanisms while operation of any other keeper will cause operation of only one of said mechanisms.

In testimony whereof I affix my signature.

SIDNEY L. PRESSEY.